United States Patent

Tomita

[11] Patent Number: 6,036,347
[45] Date of Patent: Mar. 14, 2000

[54] NUMERICAL CONTROL INFORMATION GENERATOR FOR CONTROLLING MACHINE TOOL PROCESSES WHICH REQUIRE TOOL EXCHANGES

[75] Inventor: Hiroki Tomita, Niwa-gun, Japan

[73] Assignee: Okuma Corporation, Nagoya, Japan

[21] Appl. No.: 08/870,139

[22] Filed: Jun. 5, 1997

[30] Foreign Application Priority Data

Jun. 13, 1996 [JP] Japan .................................. 8-152394

[51] Int. Cl.$^7$ ................................................... G06F 15/46
[52] U.S. Cl. ............................ 364/474.11; 364/474.02; 364/474.15; 364/474.21
[58] Field of Search ...................... 364/474.28, 474.02, 364/474.2, 474.21, 474.22, 474.23, 474.15, 474.32, 474.33, 474.11

[56] References Cited

U.S. PATENT DOCUMENTS

5,815,400  9/1998  Hirai et al. ........................ 364/474.15

*Primary Examiner*—Albert De Cady
*Assistant Examiner*—Esaw Abraham
*Attorney, Agent, or Firm*—Oliff & Berridge, plc

[57] ABSTRACT

A numerical control information generator controls machine tool operations where the number of tools necessary for machining an input part shape exceeds the number of simultaneously mountable tools. The numerical control information generator divides the overall machining process into multiple machining processes so that the number of tools necessary for any of the multiple machine processes does not exceed the number of tools simultaneously mountable. The numerical control generator also determines the order of the multiple machining processes, as well as the mounting positions of the tools on the machine tool for each machining process.

22 Claims, 9 Drawing Sheets

《REGISTRATION OF MACHINING GROUPS (MACHINING POSITION)》

NUMBER OF MOUNTABLE TOOLS: 8

| | | MACHINING GROUPS |
|---|---|---|
| 1 | EXTERNAL PART | A |
| 2 | INTERNAL PART | B |
| 3 | RIGHT END FACE PART | A |

Fig. 4

| PROCESS No. | | TOOL No. | |
|---|---|---|---|
| 1 | DRILLING ← | 1 | |
| 2 | ROUGH END MILLING ← | 2 | MACHINING GROUP B |
| 3 | ROUGH INTERNAL CUTTING ← | 3 | |
| 4 | FINISH INTERNAL CUTTING ← | 4 | |
| 5 | INTERNAL GROOVE CUTTING ↑ | 5 | |
| 6 | INTERNAL THREAD CUTTING ← | 6 | |
| 7 | ROUGH OUTER FACE CUTTING ↓ | 1 | |
| 8 | ROUGH EXTERNAL CUTTING ← | 2 | |
| 9 | FINISH EXTERNAL CUTTING ← | 3 | MACHINING GROUP A |
| 10 | EXTERNAL GROOVE CUTTING ↓ | 4 | |
| 11 | EXTERNAL THREAD CUTTING ← | 5 | |

«REGISTRATION OF MACHINING GROUPS (MACHINING TYPE)»

NUMBER OF MOUNTABLE TOOLS : 8

| 1 | DRILLING | B |
| --- | --- | --- |
| 2 | ROUGH OUTER FACE CUTTING | A |
| 3 | ROUGH EXTERNAL LONGITUDINAL CUTTING | A |
| 4 | ROUGH INNER FACE CUTTING | B |
| 5 | ROUGH INTERNAL LONGITUDINAL CUTTING | B |
| 6 | FINISH OUTER FACE CUTTING | A |
| 7 | FINISH EXTERNAL LONGITUDINAL CUTTING | A |
| 8 | FINISH INNER FACE CUTTING | B |
| 9 | FINISH INTERNAL LONGITUDINAL CUTTING | B |
| 10 | FACE GROOVE CUTTING | A |
| 11 | EXTERNAL GROOVE CUTTING | A |
| 12 | INTERNAL GROOVE CUTTING | B |
| 13 | EXTERNAL THREAD CUTTING | A |
| 14 | FACE THREAD CUTTING | A |
| 15 | INTERNAL THREAD CUTTING | B |
| 16 | EXTERNAL RECESS CUTTING | A |
| 17 | INTERNAL RECESS CUTTING | B |
| 18 | TAPPING | C |
| 19 | COMBINED FACE GENERATING CUTTING | D |
| 20 | COMBINED SIDE SURFACE GENERATING CUTTING | C |
| 21 | COMBINED FACE KEYWAY CUTTING | D |
| 22 | COMBINED SIDE SURFACE KEYWAY CUTTING | C |
| 23 | COMBINED DRILLING ← | D |
| 24 | COMBINED DRILLING → | |

MACHINING GROUP

NUMERICAL CONTROL INFORMATION GENERATOR FOR CONTROLLING MACHINE TOOL PROCESSES WHICH REQUIRE TOOL EXCHANGES

BACKGROUND OF THE INVENTION

1. Field of the Invention

The present invention relates to a numerical control information generator for generating numerical control information for machine tools having a turret on the basis of overall machining shape and material shape input.

2. Description of the Related Arts

Figure 8:
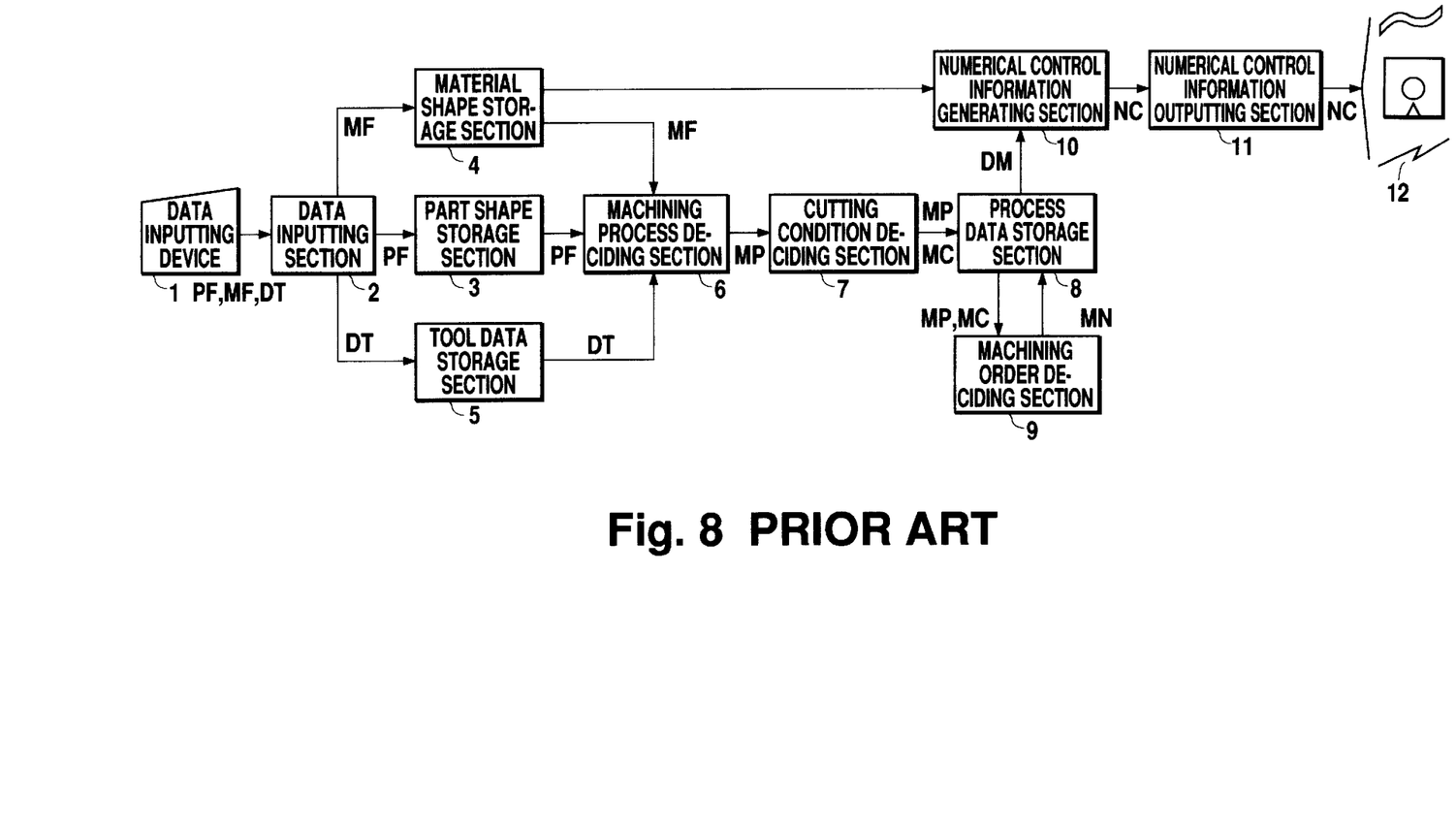
FIG. 8 is a block diagram showing an example of a conventional numerical control information generator.

FIG. 8 is a block diagram showing an example of a conventional numerical control information generator. Procedures for generating numerical control information will now be described with reference to this block diagram.

In conventional equipment, a data inputting section 2 respectively stores the machining shape (part shape) PF and the material shape MF, which are input into a data inputting device 1 from outside, into a part shape storage section 3 and a material shape storage section 4. In addition, tool data DT comprising tool types, included angles, cutting edge angles, tool widths (grooving tools), diameters of holders, etc. is stored into a tool data storage section 5. A machining process deciding section 6 reads out the material shape MF and the part shape PF from the respective storage sections 4 and 3, and extracts the whole cutting zone to be machined from the difference between the material shape MF and the part shape PF. In addition, the machining process deciding section 6 reads out the tool data DT, and divides the extracted whole cutting zone into sub-cutting zones which can be machined using the respective selected tools. That is to say, the machining process deciding section 6 decides the machining processes MP necessary for machining the part shape PF by estimating the sub-cutting zones which can completely remove the whole cutting zone of the part shape PF.

Next, a cutting condition deciding section 7 successively reads out the decided machining process MP, and decides the machining conditions MC for the respective machining processes MP. The decided cutting conditions MC are stored into a process data storage section 8. A machining order deciding section 9 successively reads out the machining processes MP stored in the process data storage section 8, and stores them again into the process data storage section 8 after rearranging them as an appropriate machining order MN. A numerical control information generating section 10 generates numerical control information NC by reading-out the material shape MF stored in the material shape storage section 4 and a process data DM such as the machining process MP, the cutting conditions MC, the machining order MN, etc., which are stored in the process data storage section 8. The numerical control information NC is output to the outside via a numerical control information outputting section 11 as a form of media 12 such as a communication circuit, a magnetic disk, or paper tape.

Processing for deciding the machining process MP in the conventional numerical control information generator will now be described in detail.

The number of tools mountable on a turret (tool post) of a lathe depends on the structure of the turret. For example, it could be eight or twelve. Let us consider the case of machining using a lathe which can simultaneously mount eight tools as an example. The automatic generation of machining processes performed by the prior art for the shape shown in FIG. 9 (bar materials, threads and grooves on external and internal surfaces) will be described with reference to the flow chart shown in FIG. 10.

Figure 9:
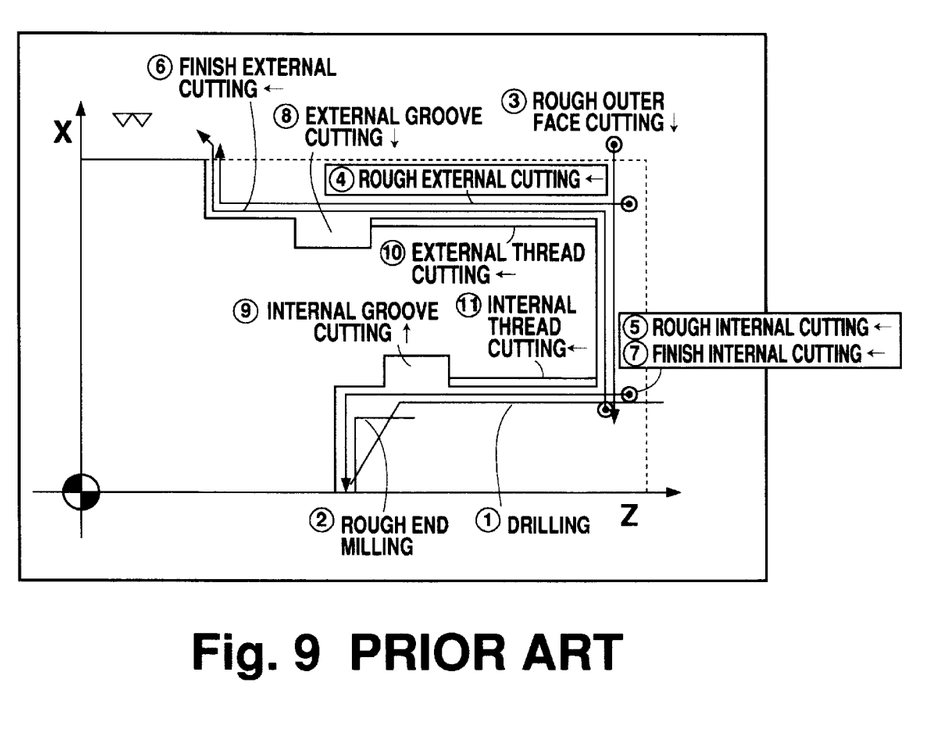
FIG. 9 is a figure showing an example of a part shape and machining processes for it in a conventional numerical control information generator.
Figure 10:
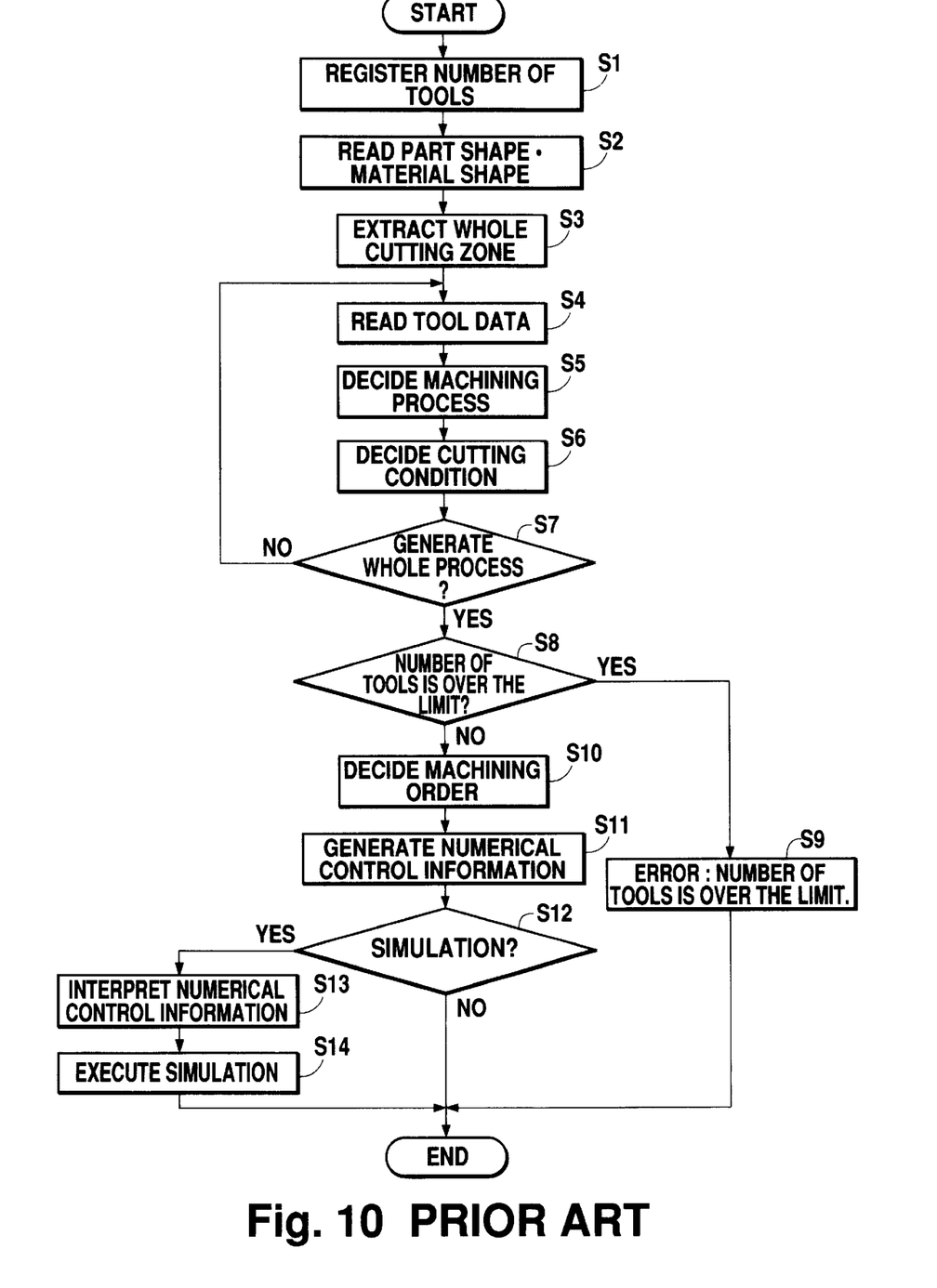
FIG. 10 is a flow chart showing a flow of processing in a conventional numerical control information generator.

When an operator registers a mountable number (8) of tools with this equipment (S1), the part shape PF and the material shape MF, which are already input, are read out (S2). The whole cutting zone to be machined is extracted by taking the difference between the two shapes (S3). Next, let us assume that a drill has been selected as the result of the search of the tool data in order to machine the bore (S4). The zone to be machined by the drill is estimated from the tool shape such as the diameter and the point angle of the drill, and the drilling processes and the drilling conditions are decided (S5, S6). Next, the process for removing a part which is uncut by the drill tip is decided as end milling. In addition, a tool for the bore (boring bar) is selected, and the remaining roughing and finishing processes are decided. Thus, when a plurality of tools are used for one cutting zone (machining position), a plurality of machining processes are decided. That is to say, machining processes are decided by machining positions and tools to be used. Such procedures are repeated for the whole processes (S4–S7). In the case of FIG. 9, for example, eleven machining processes in total such as 1. drilling, 2. rough end milling, 3. rough outer face cutting, . . . 11. internal threading cutting are decided.

If the number of tools necessary for the machining is less than the number of simultaneously mountable tools (S8), the numerical control information is generated after deciding the overall machining order by rearranging the respective machining processes decided separately (S10, S11). If it is checked whether or not the required machining can be accurately carried out (S12), simulation of the machining can be conducted by interpreting the generated numerical control information (S13, S14).

On the other hand, if the number of the tools necessary for machining exceeds the number of the simultaneously mountable tools in step 8, it is impossible to machine the workpiece using the tools mounted on the turret. For example, if all of the tools are different for all of the machining processes, eleven tools are necessary for the part shape shown in FIG. 9. Therefore, this shape can not be machined using the simultaneously mountable 8 tools. When more tools than the number of simultaneously mountable tools are necessary like this, the processing ends showing an error message such as "Number of tools is over the limit", during the automatic generation (S9).

As mentioned above, in the conventional numerical control information generator, when more tools than the number of simultaneously mountable tools are necessary, an operator should perform a process editing operation, such as separation of external/internal thread cutting, using an additionally provided editing means, not shown in the figure, so as to perform the machining using less tools than the number of simultaneously mountable tools.

In addition, when the machining is intended to be carried out by separating it into the internal part and the external part beforehand, manual operations from the shape input to the preparation of the machining programs become necessary for two machining shapes of the internal part and the external part respectively. Therefore, there is such a problem that this method requires a lot of time and labor for an operator.

SUMMARY OF THE INVENTION

The present invention solves such problems as have been described above. An object of the present invention is to provide a numerical control information generator that can easily cope with even the case where the number of tools necessary for machining the input part shape exceeds the number of simultaneously mountable tools.

In order to achieve the above-mentioned object, the numerical control information generator of the present invention is characterized by the fact that a numerical control information generator for generating numerical control information to control a machine tool, on which a certain number of tools are simultaneously mountable, so as to cut a workpiece having a specified part shape by deciding an overall machining process for performing machining on the basis of input data for a part shape, a material shape, and a tool data, by further dividing the whole machining process into a plurality of machining processes, and by properly rearranging the order of the divided machining processes, comprises a machining process dividing means for deciding the tools to be used in the overall machining process, and for further dividing machining processes necessary for the material into a plurality of machining processes on the basis of tool data concerning the decided tools, and a machining process deciding means for deciding the machining order of the divided machining processes and also for deciding mounting positions of the tools on the machine tool in the respective divided machining processes, wherein the machining process dividing means further divides the divided machining process when the number of necessary tools exceeds the number of the mountable tools in any of the divided machining processes.

In addition, the numerical control information generator of the present invention is characterized by the fact that the numerical control information generator for generating numerical control information to control a machine tool, on which a certain number of tools are simultaneously mountable, so as to cut a workpiece having a specified shape by deciding an overall machining process for performing machining on the basis of input data for a part shape, a material shape, and a tool data, and by further dividing the whole machining process into a plurality of machining processes, and by properly rearranging the order of the divided machining processes, comprises a machining group registering means for forming machining groups by classifying machining processes for materials according to a predetermined rule and for registering the machining groups beforehand, a machining process dividing means for deciding the tools to be used in the overall machining process and for dividing the machining processes necessary for machining materials on the basis of the tool data concerning the decided tools into a plurality of machining processes according to the respective registered machining groups, and a machining process deciding means for deciding the machining order of the divided machining processes and also deciding the mounting positions of the tools on the machine tool in the respective divided machining processes.

In addition, the above-mentioned machining process dividing means is characterized by the fact that the machining process dividing means further divides the divided machining processes on the basis of subclassified machining groups after subclassifying the referred machining groups when the number of necessary tools exceeds the number of the mountable tools in any of the divided machining processes.

In addition, the above-mentioned machining group registering means is characterized by the fact that the machining group registering means forms machining groups by classifying machining processes for materials according to the types of machining.

In addition, the above-mentioned machining group registering means is characterized by the fact that the machining group registering means forms machining groups by classifying machining processes for materials according to machining positions.

In addition, the numerical control information generator of the present invention is characterized by the fact that the numerical control information generator comprises a machining group selecting means for selecting a machining group from the machining group registering means so as to generate numerical control information only for the selected machining group.

In order to achieve the above-mentioned object, the numerical control information generator of the present invention controls a machine tool on which a certain number of tools are simultaneously mountable, so as to cut a workpiece having a specified part shape. The numerical control information generator decides an overall machining process for performing machining on the basis of input data for the part shape, the material shape and tool data. Then the overall machine process is divided into a plurality of machining processes such that the number of tools required for any of the plurality of machining processes does not exceed the total number of mountable tools available. The numerical control information generator comprises a machining process dividing section for deciding which tools are to be used in the overall machining process and for dividing the overall machining process into a plurality of machining processes on the basis of tool data. The numerical control information generator also comprises a machining process deciding section for deciding the order of the machining processes, as well as for deciding the mounting positions of the tools.

In addition, in another embodiment of the present invention, the numerical control information generator comprises a machining group registering section for forming machining groups by classifying machining processes for materials according to a predetermined rule and for registering the machining groups, in addition to the machining process dividing section and the machining process deciding section.

In addition, the machining process dividing section may further divide the previously divided machining processes if necessary to avoid a number of tools for one of the divided processes which exceeds a number of mountable tools available.

In addition, a machining group registering section may form machining groups by classifying machine processes either according to machining types or according to machining positions.

In addition, the numerical control information generator may comprise a machining group selecting section for selecting a machining group from the machining group registering section in order that numerical control information is only generated for the selected machining group.

BRIEF DESCRIPTION OF THE DRAWING

FIG. 7 (a) is a figure showing an example of cutting zones to be divided when cutting is performed in order of "external part•right end face part→internal part", and FIG. 7 (b) is a figure showing an example of cutting zones to be divided when cutting is performed in order of "internal part→external part•right end face part".

DESCRIPTION OF THE PREFERRED EMBODIMENTS

Figure 1:
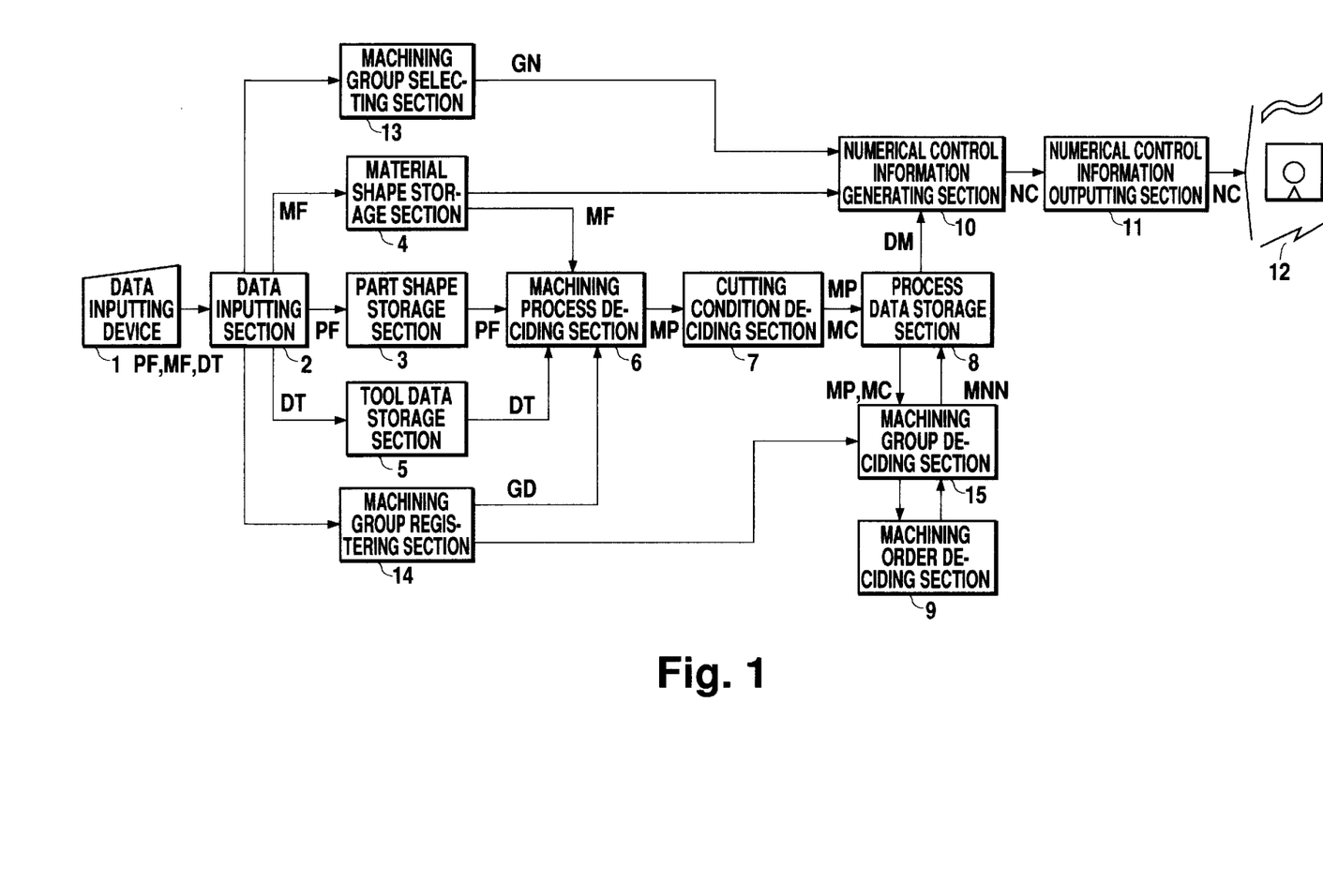
FIG. 1 is a block diagram showing an embodiment of a numerical control information generator of the present invention.

A preferred embodiment of the numerical control information generator in the present invention is shown in FIG. 1. The same components as those of the conventional numerical control information generator are designated by the same numerals and symbols.

The present embodiment comprises a machining group registering section 14 which forms machining groups by classifying machining operations for a material according to a predetermined rule and registers the machining groups beforehand, a machining group deciding section 15 for deciding the machining order of the divided machining processes and also for deciding the mounting positions of the tools on the machine tool in the respective machining processes, and a machining group selecting section 13 for selecting machining groups from the machining group registering section 14, in addition to the components of the conventional generator. In addition, a machining process deciding section 6 in the present embodiment is a machining process dividing means for deciding the tools to be used in the overall machining process and dividing the machining processes necessary for machining the material on the basis of the tool data concerning the decided tools into a plurality of machining processes on the basis of the respective registered machining groups.

A machining group GD registered into the machining group registering section 14 is sent to the machining process deciding section 6 together with the tool data DT (tool types, tool geometry such as an included angle and a cutting edge angle), a part shape PF, and a material shape MF. Individual machining processes MP are generated for the cutting zone divided on the basis of the machining groups and stored into a process data storage section 8 after adding cutting conditions MC at a cutting condition deciding section 7. The machining group GD is also read by a machining group deciding section 15. The machining process in the same machining group is extracted from the individual machining processes MP. The machining process MNN arranged by a machining order deciding section 9 so as to be suitable for the machining group is stored again in the process data storage section 8. A numerical control information generating section 10 generates not only the numerical control information for the overall machining process, but also the numerical control information for every machining group (selected data) GN selected by the machining group selecting section 13.

A characteristic of the present embodiment is that the machining processes for the material is classified beforehand into machining groups according to a predetermined rule, and the overall machining process is divided beforehand on the basis of the classified machining groups so that the number of the tools necessary for the machining does not exceed the number of simultaneously mountable tools of a turret lathe. Another characteristic is that if it is found that the number of the tools necessary for machining exceeds the number of simultaneously mountable tools of the turret lathe after generating and processing the numerical control information, the number of necessary tools is reduced so as to be less than the number of the simultaneously mountable tools, by automatically dividing the process in question furthermore into a plurality of machining processes.

Figure 2:
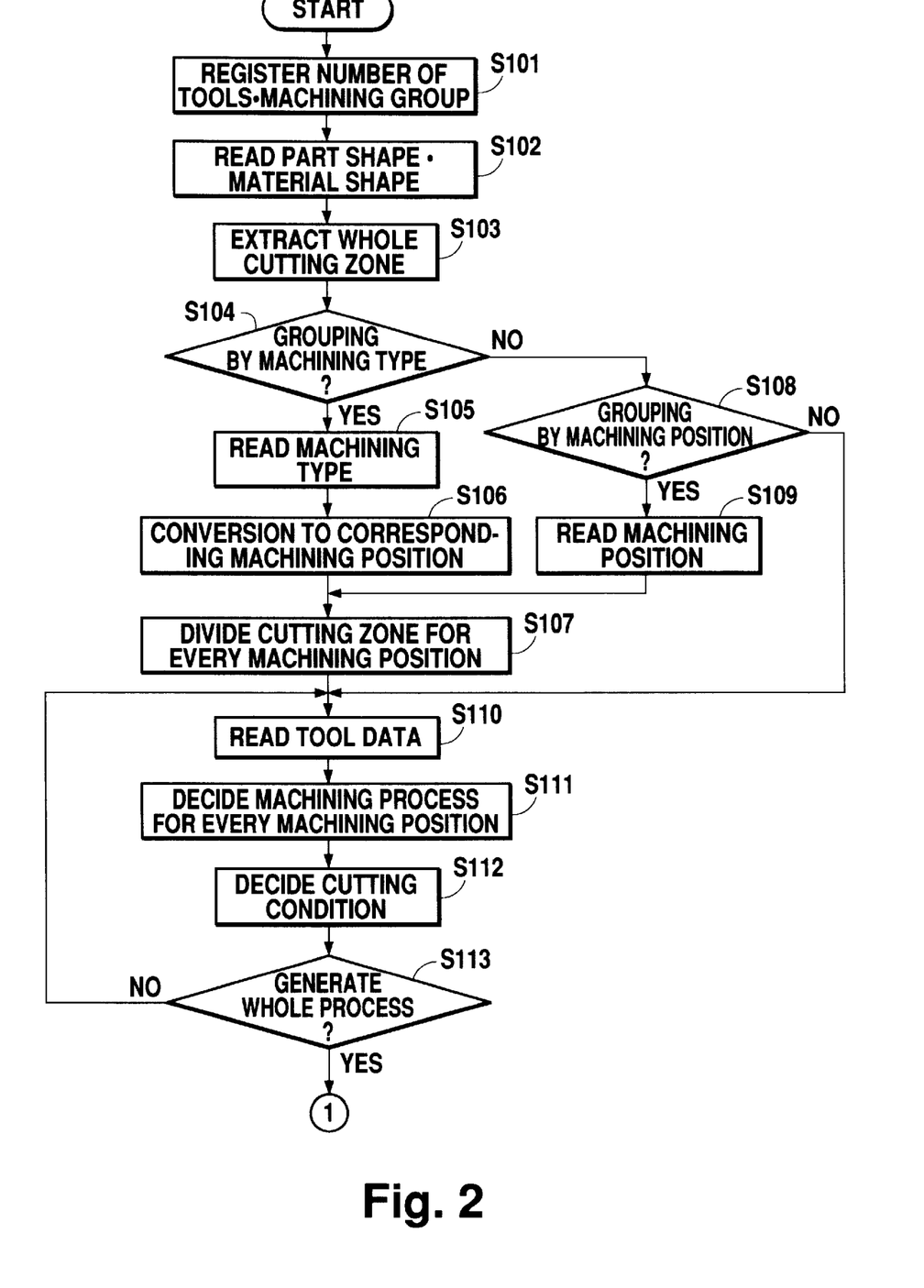
FIG. 2 is a flow chart showing a flow of processing in the embodiment.
Figure 3:
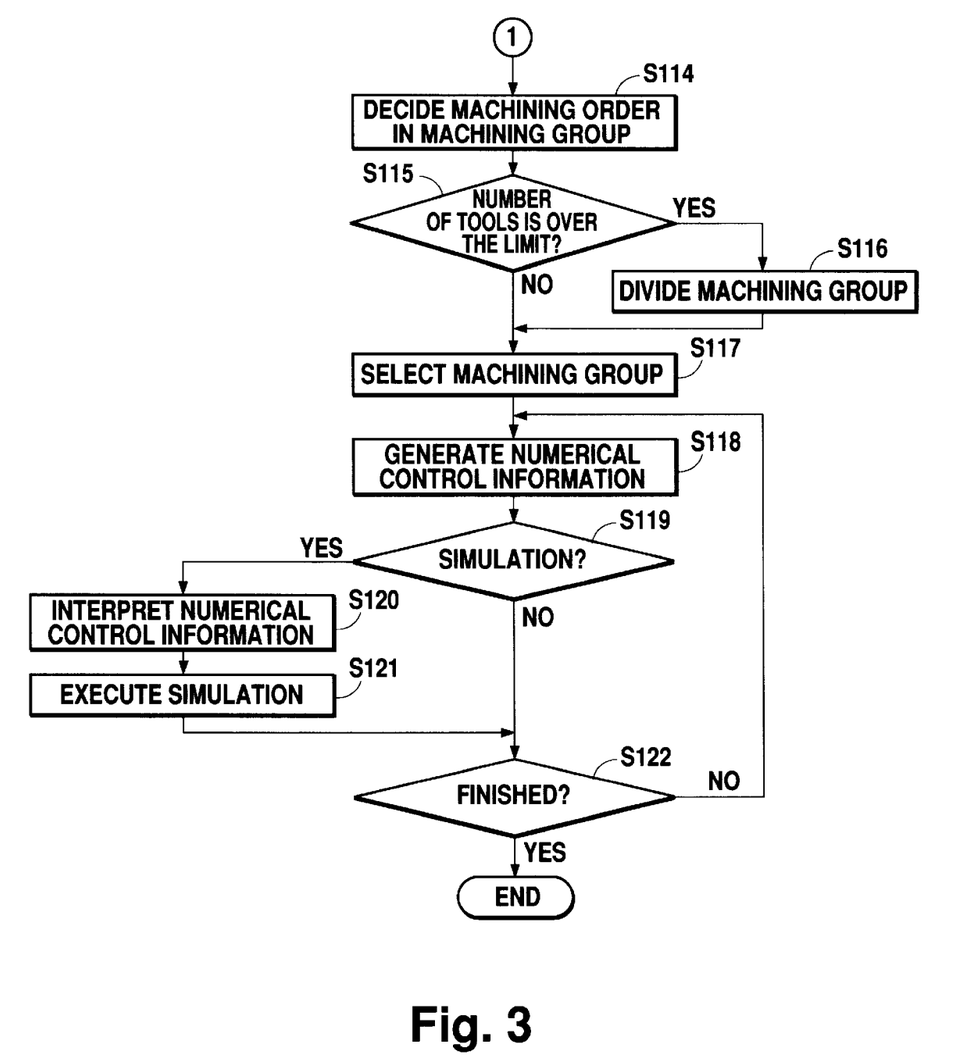
FIG. 3 is a flow chart showing a flow of processing in the embodiment.

Next, the processing in the present embodiment will be described with reference to FIGS. 2 and 3.

Figure 4:
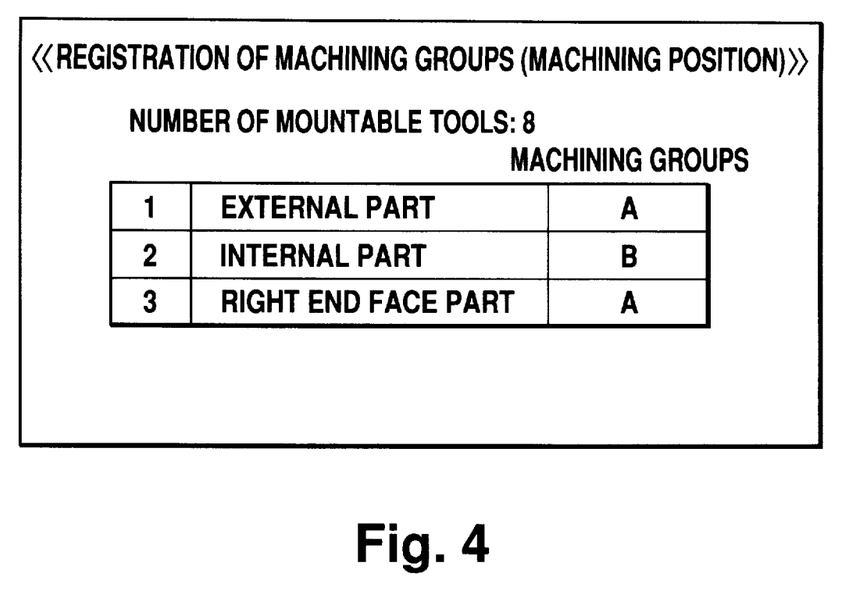
FIG. 4 is a figure showing an example when machining groups are registered for every machining position in the embodiment.
Figure 5:
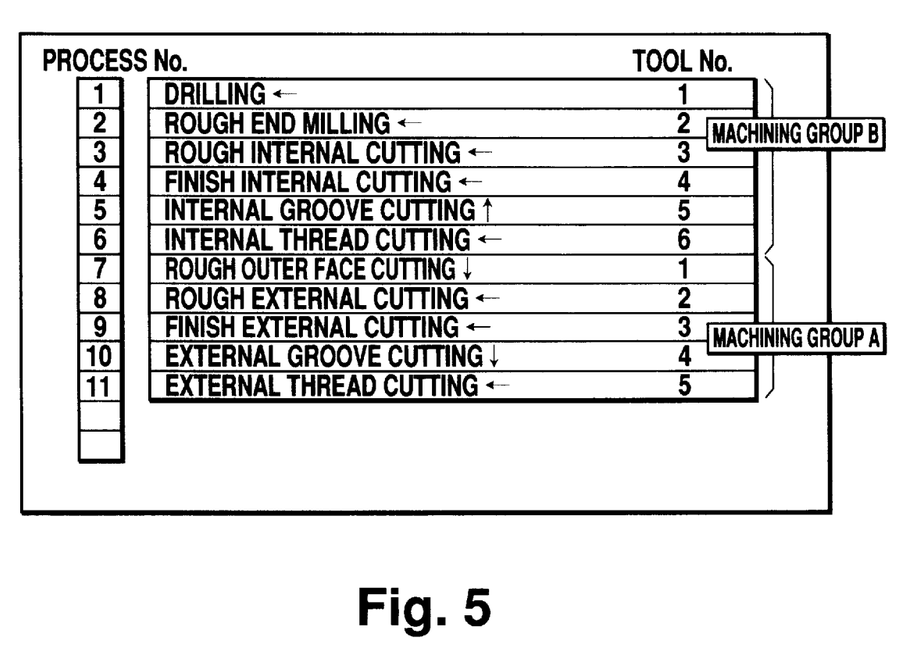
FIG. 5 is a figure showing an example of machining processes to be formed when machining groups have been registered for every machining position in the embodiment.
Figure 6:
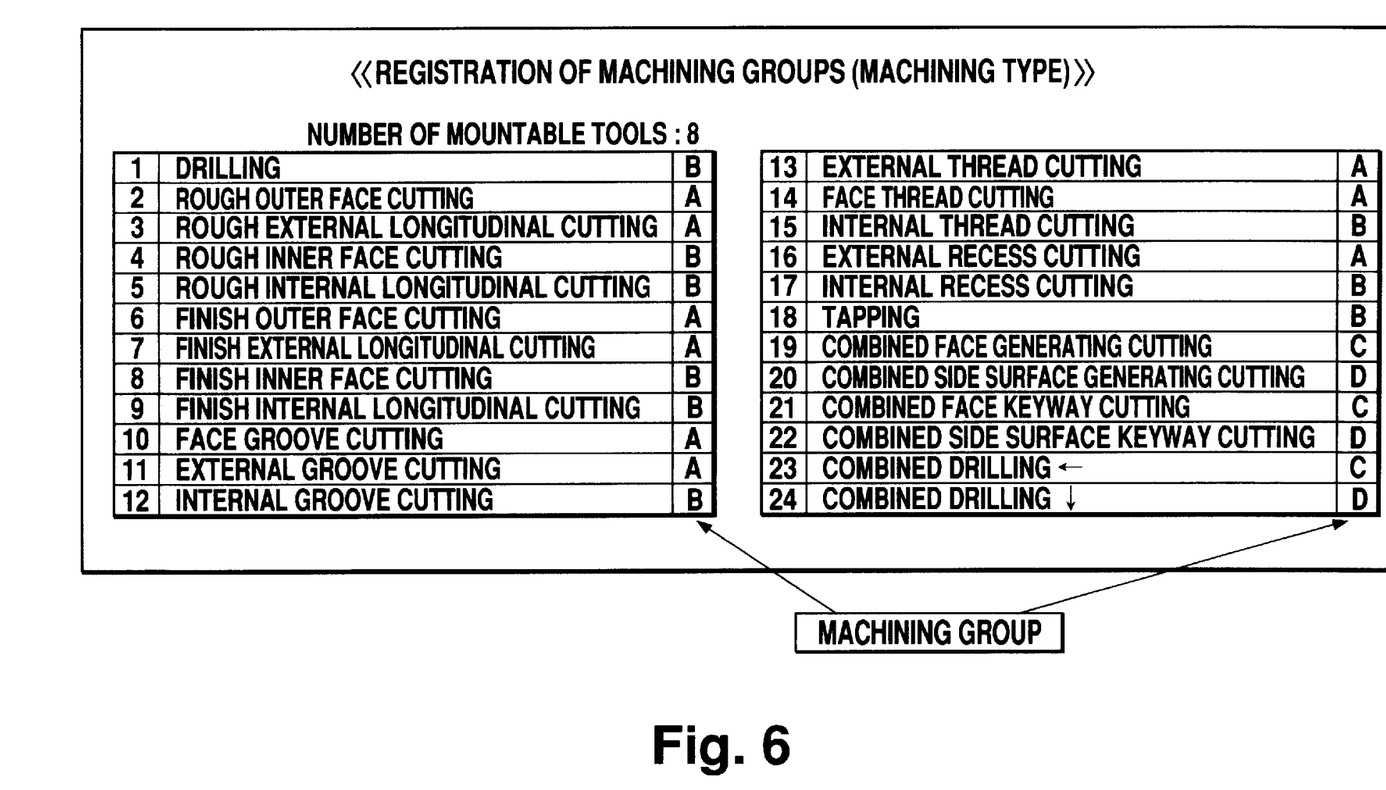
FIG. 6 is a figure showing an example when machining groups are registered for every machining type in the embodiment.

The numerical control information generator of the present embodiment first classifies the machining positions and the machining types to be collectively machined into groups and registers the respective groups in the machining group registering section 14 as the machining groups prior to the automatic determination of the machining processes together with the number of the mountable tools via the data inputting section 2 (S101). In the present embodiment, it is possible that a plurality of machining processes constituting the overall machining process necessary for machining the material are divided into some machining processes, and the respective divided machining processes are treated as machining groups. The following methods may be considered as methods for deciding the machining groups; a method for classifying the machining processes beforehand according to machining positions, a method for classifying the machining groups according to machining types, and a method for automatically classifying the machining groups according to a certain rule so that the number of tools is less than the number of mountable tools from the overall machining order. When the machining groups are designated according to the machining positions, the designation is carried out by such classifications as "external part", "internal part", "right end face part" . . . . FIG. 4 shows an example of the machining groups designated by the machining positions. FIG. 5 shows an example of the machining processes in the case of registering them so as to collectively perform the machining by taking "external part, right end face part" as a machining group A and "internal part" as a machining group B. When the machining groups are designated in detail according to the machining types, the designation is carried out by assigning the labels A, B, C, . . . showing the respective machining groups to the names of the detailed machining types such as "drilling", "rough external longitudinal cutting", "rough internal longitudinal cutting", "finish external longitudinal cutting", "finish internal longitudinal cutting", . . . ," combined cutting (end face generation, end face keyway cutting, . . . ). In an example shown in FIG. 6, the machining groups are classified into the machining group A containing "rough outer face cutting", "rough external longitudinal cutting", "finish outer face cutting" . . . , the machining group B containing "drilling", "rough inner face cutting", "rough internal longitudinal cutting", . . . , and the machining groups C and D containing "combined cutting". In other words, the machining group A is for the "external part" and the "outer right end face part", the machining group B is for the "internal part", the machining group C is for the "combined end face cutting", and the machining group D is for the "combined side surface cutting". When it is not necessary to specially designate any collective machining process (machining group), only the number of simultaneously mountable tools is registered.

When the machining groups decided in such a way according to a predetermined rule are registered beforehand, the machining process deciding section 6 reads out the stored part shape and the stored material shape from the respective storage sections 3 and 4 (S102). Then, the overall cutting zone to be machined is determined by taking the difference between the two shapes (S103). After that, the overall cutting zone is divided into a plurality of cutting zones (machining positions) for the respective machining groups. Then, the processing advances to the next steps after judging whether the machining groups are designated according to the machining types or the machining positions, or are not yet designated (S104, S108).

When the machining processes are classified according to the machining types, the machining process deciding section 6 reads out the classified machining types (S105), and divides the overall cutting zone into the sub-cutting zones according to the labels assigned for every machining type. In other words, the machining positions are judged and classified for every machining group (S106).

Figure 7:
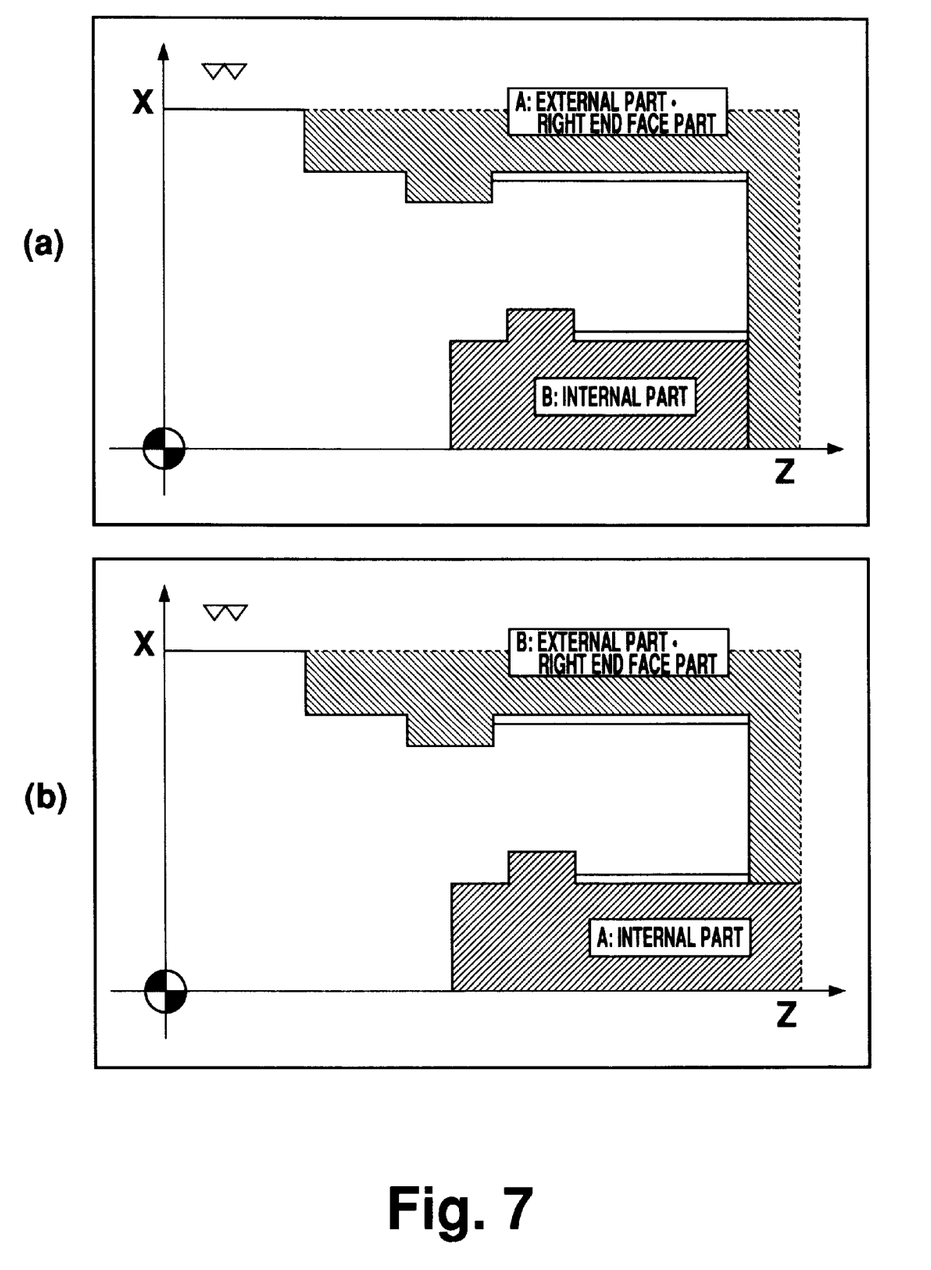

On the other hand, when the machining processes are classified according to the machining positions, it is sufficient to read out the data showing the machining positions corresponding to the machining groups (S109). Next, the machining process deciding section 6 divides the overall machining zone as shown in FIG. 7 on the basis of the machining positions (S107). At that time, boundaries of the cutting zones are sometimes different according to the machining order. Therefore, the machining order of the machining positions may be designated in alphabetical order of the name of the machining group. FIG. 7 (*a*) shows the case where the machining is performed in the order of "external part, right end face part→internal part", and FIG. 7 (*b*) shows the case where the machining is performed in the order of "internal part→external part, right end face part".

Next, the machining process deciding section 6 decides individual machining processes for every divided cutting zone (the overall cutting zone when machining groups are not registered). When the machining is performed in the order of "internal part→external part, right end face part", the cutting zone, "A: internal part", shown in FIG. 7 (*b*) is extracted. After searching the tool data, a drill is selected (S110). The machining process deciding section 6 decides a drilling process by estimating the zone to be machined by the drill, and also decides the cutting conditions (S111, S112). Next, machining processes such as rough inner face cutting, rough internal longitudinal cutting, finish internal longitudinal cutting, internal groove cutting, and internal thread cutting are decided. A series of machining processes for other cutting zone are also decided, and the same procedures are repeated until the overall process is covered (S110–S113). Thus, the machining order is decided in the respective divided machining processes (S114).

When the number of tools necessary for machining in the overall machining process is less than the number of simultaneously mountable tools, the processing advances to the step for selecting the machining group in order to generate the numerical control information (S115). As described in the case of the conventional generator, unless the machining group is designated beforehand, eleven tools are necessary for machining the workpiece shown in FIG. 9, although the number of simultaneously mountable tools is eight. In this case, in the present embodiment, the machining process deciding section 6 separates the machining processes which can be performed using up to eight tools and the remaining processes into different groups after the overall machining order has been decided. Then, mounting positions of the tools on the turret are allocated in the respective groups (S116). In other words, in the case of FIG. 9, the groups of machining processes divided according to the two machining groups such as "drilling, rough end milling, . . . , groove cutting↓" (machining group A) and "groove cutting↑, external thread cuttings←, internal thread cuttings←" (machining group B) are formed. Then, mounting positions of the tools on the turret are decided in the respective machining groups A and B. Furthermore, if the number of tools to be used exceeds the number of simultaneously mountable tools in the respective machining groups A and B although the machining groups A and B have been registered, the machining process deciding section 6 further divides the machining processes contained in the machining groups concerned into a plurality of machining processes on the basis of the subclassified machining groups obtained by subclassifying the referred machining groups.

Thus, when the machining group selecting section 13 designates either of the machining groups after the machining order has been decided in the respective subdivided machining processes, the numerical control information can be generated for every designated machining group (S117, S118). In addition, a simulation for checking whether a machine tool operates exactly or not by the generated numerical control information can be performed for every machining process divided on the basis of the machining groups selected by the machining group selecting section 13 (S119–S121). After generation of the numerical control information for the required machining groups has been finished, the processing ends (S122).

What is claimed is:

1. A numerical control information generator for generating numerical control information to control a machine tool, on which a certain number of tools are simultaneously mountable, so as to cut a workpiece having a specified shape by deciding an overall machining process for performing machining based on input data for a machining shape, a material shape, and tool data, and by further dividing the overall machining process into a plurality of machining processes, and by properly rearranging an order of the divided machining processes, comprising:

a machining process dividing means for deciding tools to be used in the overall machining process, and for further dividing machining processes necessary for machining the material into a plurality of machining processes based tool data concerning the decided tools; and a machining process deciding means for deciding a machining order of the divided machining processes and also for deciding mounting positions of the decided tools on the machine tool in each of the divided machining processes, respectively;

wherein the machining process dividing means further automatically divides the divided machining process when a number of necessary tools exceeds a number of mountable tools in any of the divided machining processes.

2. A numerical control information generator for generating numerical control information to control a machine tool, on which a certain number of tools are simultaneously mountable, so as to cut a workpiece having a specified shape by deciding an overall machining process for performing machining based on input data for a machining shape, a material shape, and tool data, and by further dividing the overall machining process into a plurality of machining processes, and by properly rearranging an order of the divided machining processes, comprising:

a machining group registering means for forming machining groups by classifying machining processes for materials and for registering the machining groups beforehand;

a machining process dividing means for deciding tools to be used in the overall machining process and for dividing the machining processes necessary for machining materials into a plurality of machining processes, based on tool data concerning the decided tools for each of the registered machining groups respectively; and a machining process deciding means for automatically deciding a machining order of the divided machining processes and also deciding mounting positions of the decided tools on the machine tool in each of the divided machining processes respectively.

3. The numerical control information generator according to claim 2, wherein the machining process dividing means further divides the divided machining processes based on subclassified machining groups after subclassifying the registered machining groups when a number of necessary tools exceeds a number of mountable tools in any of the divided machining processes.

4. The numerical control information generator according to claim 2, wherein the machining group registering means forms the machining groups by classifying machining processes for materials according to machining types.

5. The numerical control information generator according to claim 2, wherein the machining group registering means forms the machining groups by classifying machining processes for materials according to machining positions.

6. The numerical control information generator according to claim 2, further comprising:

a machining group selecting means for selecting a one of the machining groups from the machining group registering means so as to generate numerical control information only for the selected said one of the machining groups.

7. A numerical control information generator that generates numerical control information to control a machine tool, on which a certain number of tools are simultaneously mountable, by deciding an overall machining process for performing machining, comprising:

machining process dividing means for deciding tools to be used in the overall machining process and for automatically dividing, when a number of tools necessary for performing the overall machining process exceeds the number of mountable tools, the overall machining process into a plurality of divided machining processes.

8. A numerical control information generator according to claim 7, wherein, when a number of tools necessary for performing one of the divided machining process also exceeds the number of mountable tools, the machining process dividing means subdivides at least one of the divided machining process into a plurality of subdivided machining processes based on tools necessary for performing the divided machining process.

9. A numerical control information generator according to claim 7, wherein the machining process dividing means divides the overall machining process into a plurality of machining processes based on input data for at least one of a machining shape, a material shape, and tool data.

10. A numerical control information generator according to claim 9, wherein the machining process dividing means subdivides each divided machining process for which a number of necessary tools exceeds a number of mountable tools.

11. A numerical control information generator according to claim 10, wherein the machining process dividing means subdivides each divided machining process into a plurality of subdivided machining processes based on tools necessary for performing the divided machining process.

12. A numerical control information generator according to claim 7, further comprising machining process deciding means for deciding a machining order of the divided machining processes and for deciding mounting positions of the decided tools on the machine tool in each of the divided machining processes.

13. A numerical control information generator for generating numerical control information to control a machine tool, on which a certain number of tools are simultaneously mountable, by deciding an overall machining process for performing machining, comprising:

machining group registering means for forming machining groups by classifying machining processes for materials and for registering the machining group beforehand; and machining process dividing means for deciding tools to be used in the overall machining process, and for automatically dividing, when a number of tools necessary for performing the overall machining process exceeds the number of mountable tools, the overall machining process into a plurality of divided machining processes.

14. A numerical control information generator according to claim 13, wherein, when a number of tools necessary for performing one of the divided machining process also exceeds the number of mountable tools, the machining process dividing means subdivides at least one divided machining process into a plurality of subdivided machining processes based on tools necessary for performing the divided machining process.

15. A numerical control information generator according to claim 13, wherein the machining process dividing means subdivides each divided machining process for which a number of necessary tools exceeds a number of mountable tools.

16. A numerical control information generator according to claim 15, wherein the machining process dividing means subdivides each divided machining process into a plurality of subdivided machining processes based on tools necessary for performing the divided machining process.

17. A numerical control information generator according to claim 13, further comprising a machining process deciding means for deciding a machining order of the divided machining processes and for deciding mounting positions of the decided tools on the machine tool in each of the divided machining processes.

18. The numerical control generator according to claim 14, wherein the machining process dividing means further divides the divided machining process based on subclassified machining groups after subclassifying the registered machining groups when a number of necessary tools exceeds the number of mountable tools in any of the divided machining processes.

19. A numerical control information generator according to claim 13, wherein the machining process dividing means divides the overall machining process into a plurality of machining processes based on input data for at least one of a machining shape, a material shape, and tool data.

20. The numerical control information generator according to claim 13, wherein the machining groups registering means forms the machining groups by classifying machining processes for materials according to machining types.

21. The numerical control information generator according to claim 13, wherein the machining groups registering means forms the machining groups by classifying machining processes for materials according to machining positions.

22. The numerical control information generator according to claim 13, further comprising machining group selecting means for selecting one of the machining groups from the machining group registering means to generate numerical control information only for the selected one of the machining groups.

* * * * *